US008550959B2

(12) United States Patent
Ueki

(10) Patent No.: US 8,550,959 B2
(45) Date of Patent: Oct. 8, 2013

(54) VEHICLE DRIVE SYSTEM

(75) Inventor: Nobukazu Ueki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/375,051

(22) PCT Filed: Nov. 24, 2010

(86) PCT No.: PCT/JP2010/070941

§ 371 (c)(1),
(2), (4) Date: Nov. 29, 2011

(87) PCT Pub. No.: WO2012/070131

PCT Pub. Date: May 31, 2012

(65) Prior Publication Data

US 2013/0237372 A1    Sep. 12, 2013

(51) Int. Cl.
B60W 10/04 (2006.01)
B60W 10/10 (2012.01)
B60W 10/02 (2006.01)
G06F 19/00 (2011.01)
G06G 7/70 (2006.01)
G06G 7/00 (2006.01)

(52) U.S. Cl.
USPC ............ 477/110; 477/181; 701/104; 701/112

(58) Field of Classification Search
USPC .................. 477/107–111, 181; 701/54, 103, 701/104, 112
See application file for complete search history.

(56) References Cited

U.S. PATENT DOCUMENTS

| 6,190,284 | B1 * | 2/2001 | Kuroda et al. | 477/107 |
| 6,267,706 | B1 * | 7/2001 | Kuroda et al. | 477/107 |
| 6,763,903 | B2 * | 7/2004 | Morimoto et al. | 180/65.26 |
| 7,285,073 | B2 * | 10/2007 | Iriyama | 477/110 |
| 2007/0205036 | A1 * | 9/2007 | Ogata et al. | 180/337 |

FOREIGN PATENT DOCUMENTS

| JP | A-04-185541 | 7/1992 |
| JP | A-11-257121 | 9/1999 |
| JP | A-2000-110930 | 4/2000 |
| JP | A-2004-060578 | 2/2004 |
| JP | A-2007-230271 | 9/2007 |
| JP | A-2008-267186 | 11/2008 |
| JP | A-2010-019097 | 1/2010 |
| JP | A-2010-174694 | 8/2010 |

OTHER PUBLICATIONS

International Search Report in International Application No. PCT/JP2010/070941; dated Feb. 15, 2011 (with English-language translation).

* cited by examiner

*Primary Examiner* — Tisha Lewis
(74) *Attorney, Agent, or Firm* — Oliff & Berridge, PLC

(57) ABSTRACT

A vehicle drive system is provided with an engine, a manual transmission capable of changing a gear position, a clutch arranged between the engine and the transmission, and a control device that performs drive control of the engine. During an inertia running in which torque transmission between the engine and an axle is blocked, when the clutch is opened and the gear position of the transmission is changed to a forward position, if the gear position after the change is lower than an optimal gear position corresponding to a vehicle speed, the control device executes fuel cutoff for the engine.

4 Claims, 3 Drawing Sheets

VEHICLE DRIVE SYSTEM

FIELD

The present invention relates to a vehicle drive system and more specifically relates to a vehicle drive system capable of inhibiting generation of an excessive revolution state of an engine due to a shift operation mistake at the time of switching from an inertia running to a running on the engine.

BACKGROUND

Recently, in the vehicle drive system provided with a manual transmission (MT), eco-run control to execute fuel cutoff to stop the engine during the inertia running is adopted. Herein, when a driver switches from the inertia running to the running on the engine, the driver performs shift change from neutral to a forward position. At that time, when a shift position selected by the driver is lower than the shift position, which should be essentially selected for a current vehicle speed (the shift operation mistake occurs), the engine might receive motion energy of a vehicle to be put into the excessive revolution state. Technology disclosed in the patent literature 1 is known as a conventional vehicle drive system related to such a problem.

CITATION LIST

Patent Literature

Patent Literature 1: Japanese Patent Application Laid-open No. H11-257121

SUMMARY

Technical Problem

An object of the present invention is to provide the vehicle drive system capable of inhibiting the generation of the excessive revolution state of the engine due to the shift operation mistake at the time of the switching from the inertia running to the running on the engine.

Solution to Problem

In order to achieve the above mentioned object, a vehicle drive system according to the present invention includes an engine; a manual transmission capable of changing a gear position; a clutch arranged between the engine and the transmission; and a control device that performs drive control of the engine, wherein during an inertia running in which torque transmission between the engine and an axle is blocked, when the clutch is opened and the gear position of the transmission is changed to a forward position, if the gear position after the change is lower than an optimal gear position corresponding to a vehicle speed, the control device executes fuel cutoff for the engine.

Further, in the vehicle drive system according to the present invention, when the clutch is engaged after the fuel cutoff is executed, if the gear position after the change is lower than the optimal gear position corresponding to the vehicle speed after engagement of the clutch, the control device continues the fuel cutoff for the engine.

Advantageous Effects of Invention

In the vehicle drive system according to the present invention, the fuel cutoff is executed when the gear position after the change is lower than the optimal gear position corresponding to the vehicle speed (when the shift operation mistake occurs), so that increase in an engine revolution speed by the motion energy of the vehicle is inhibited when the clutch is engaged thereafter. According to this, a case in which the engine is put into the excessive revolution state due to the shift operation mistake can be inhibited, so that there is an advantage that the engine is appropriately protected.

DESCRIPTION OF EMBODIMENTS

The present invention is hereinafter described in detail with reference to the drawings. Meanwhile, the present invention is not limited by this embodiment. Also, a component, which may be replaced or obviously replaced while maintaining identity of the invention, is included in the components of the embodiment. Also, a plurality of modified examples described in this embodiment can be optionally combined within the scope obvious to one skilled in the art.

[Vehicle Drive System]

Figure 1:
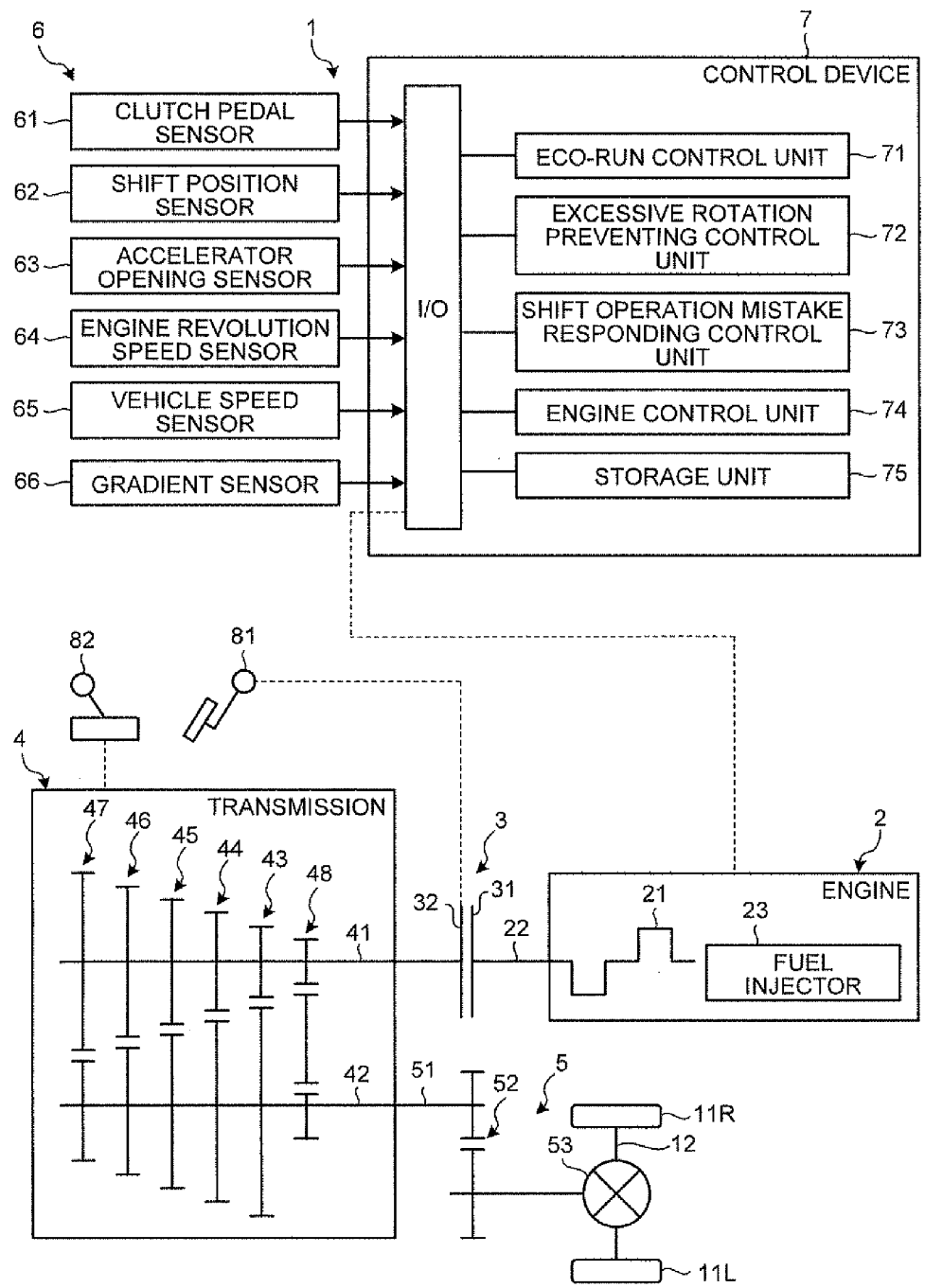
FIG. 1 is a configuration diagram illustrating a vehicle drive system according to an embodiment of the present invention.

FIG. 1 is a configuration diagram illustrating a vehicle drive system according to the embodiment of the present invention.

A vehicle drive system 1 adopts a manual transmission and is applied to a vehicle capable of realizing eco-run driving to temporarily stop an engine during an inertia running (refer to FIG. 1). The vehicle drive system 1 is provided with an engine 2, a clutch 3, a transmission 4, a reduction differential gear 5, a sensor unit 6, and a control device 7.

The engine 2 is a power source composed of an internal-combustion engine or an external-combustion engine. The engine 2 generates driving torque and outputs the same from an output shaft 22 of a crankshaft 21. Also, the engine 2 includes a fuel injector 23 and can adjust the driving torque to be generated by adjustment of a fuel injection amount by the fuel injector 23. Meanwhile, a reciprocating engine fueled by gasoline is adopted in this embodiment.

The clutch 3 is a machine element capable of allowing and blocking transmission of the driving torque. The clutch 3 includes an input-side rotor 31 and an output-side rotor 32 and is connected to the output shaft 22 of the engine 2 via the input-side rotor 31 to be arranged on a subsequent stage of the engine 2. Also, the clutch 3 allows the torque transmission in an engagement state of the input-side rotor 31 and the output-side rotor 32 and blocks the torque transmission in an open state thereof. Meanwhile, a friction clutch is adopted in this embodiment.

The transmission 4 is the manual transmission capable of changing a gear position and a gear ratio. The transmission 4 includes an input shaft 41 and an output shaft 42 and is connected to the output-side rotor 32 of the clutch 3 via the input shaft 41 to be arranged on a subsequent stage of the clutch 3. Also, the transmission 4 can change the gear ratio (ratio between a revolution speed of the output shaft 42 and the revolution speed of the input shaft 41) thereof by changing the gear position thereof. Also, the gear position of the transmission 4 is changed by operation of a shift device 82 of a driver's seat by a driver. Meanwhile, in this embodiment, a gear-type manual stepped transmission including neutral, five forward positions 43 to 47, and one reverse position 48 so as to be changeable is adopted.

The reduction differential gear 5 is a machine element, which reduces the driving torque to distribute to right and left wheels 11R and 11L of the vehicle. The reduction differential gear 5 includes an input shaft 51, a reduction mechanism 52, which reduces the driving torque, and a differential mechanism 53, which adjusts distribution of the driving torque to the right and left wheels 11R and 11L of the vehicle. Also, the reduction differential gear 5 is connected to the output shaft 42 of the transmission 4 via the input shaft 51 and is connected to an axle 12 of the wheels 11R and 11L via the differential mechanism 53.

The sensor unit 6 is a sensor group for obtaining a vehicle state amount. The sensor unit 6 includes a clutch pedal sensor 61, which detects operation of a clutch pedal 81, a shift position sensor 62, which detects a shift position of the shift device 82, an accelerator opening sensor 63, which detects accelerator opening θ, an engine revolution speed sensor 64, which detects a revolution speed of the output shaft 22 of the engine 2 (engine revolution speed) Ne, a vehicle speed sensor 65, which detects a vehicle speed V, and a gradient sensor 66, which detects a gradient of a running road.

The control device 7 is a device, which controls operation of the vehicle drive system 1, and is composed of an electrical control unit (ECU), for example. The control device 7 outputs a predetermined output signal based on an output signal of the sensor unit 6. The control device 7 includes an eco-run control unit 71, which performs eco-run control, an excessive revolution preventing control unit 72, which prevents excessive revolution of the engine 2, a shift operation mistake responding control unit 73, which controls to respond to a shift operation mistake during the inertia running, an engine control unit 74, which performs drive control of the engine 2, and a storage unit 75, which stores predetermined information (for example, various control programs, control maps, and control data such as threshold values). The control device 7 performs the drive control of the engine 2 based on the output signal of the sensor unit 6. According to this, various pieces of control are realized.

In the vehicle drive system 1, the control device 7 puts the clutch 3 into the engagement state to drive the engine 2 while the vehicle runs on the engine. Then, the engine 2 generates the driving torque and the driving torque is transmitted to the transmission 4 through the clutch 3. Then, the driving torque is changed by the transmission 4 and is reduced by the reduction differential gear 5 to be distributed to the right and left wheels 11R and 11L of the vehicle. According to this, the vehicle runs on the engine 2 as the power source.

Also, the vehicle drive system 1 can realize the eco-run control to temporarily stop the engine 2 during the inertia running of the vehicle. In the eco-run control, the control device 7 performs the drive control of the fuel injector 23 of the engine 2 to temporarily stop fuel injection (fuel cutoff) during the inertia running in which the torque transmission between the engine 2 and the axle 12 is blocked. According to this, fuel consumption is improved.

Also, the vehicle drive system 1 can realize excessive revolution preventing control to control the fuel injection amount of the engine 2 so as to prevent an excessive revolution state of the engine 2. In the excessive revolution preventing control, the control device 7 performs the drive control of the fuel injector 23 of the engine 2 to stop the fuel injection when the engine revolution speed Ne becomes larger than a predetermined set revolution speed, for example. According to this, a break of the engine 2 due to the excessive revolution is prevented.

[Shift Operation Mistake Responding Control During Inertia Running]

Figure 2:
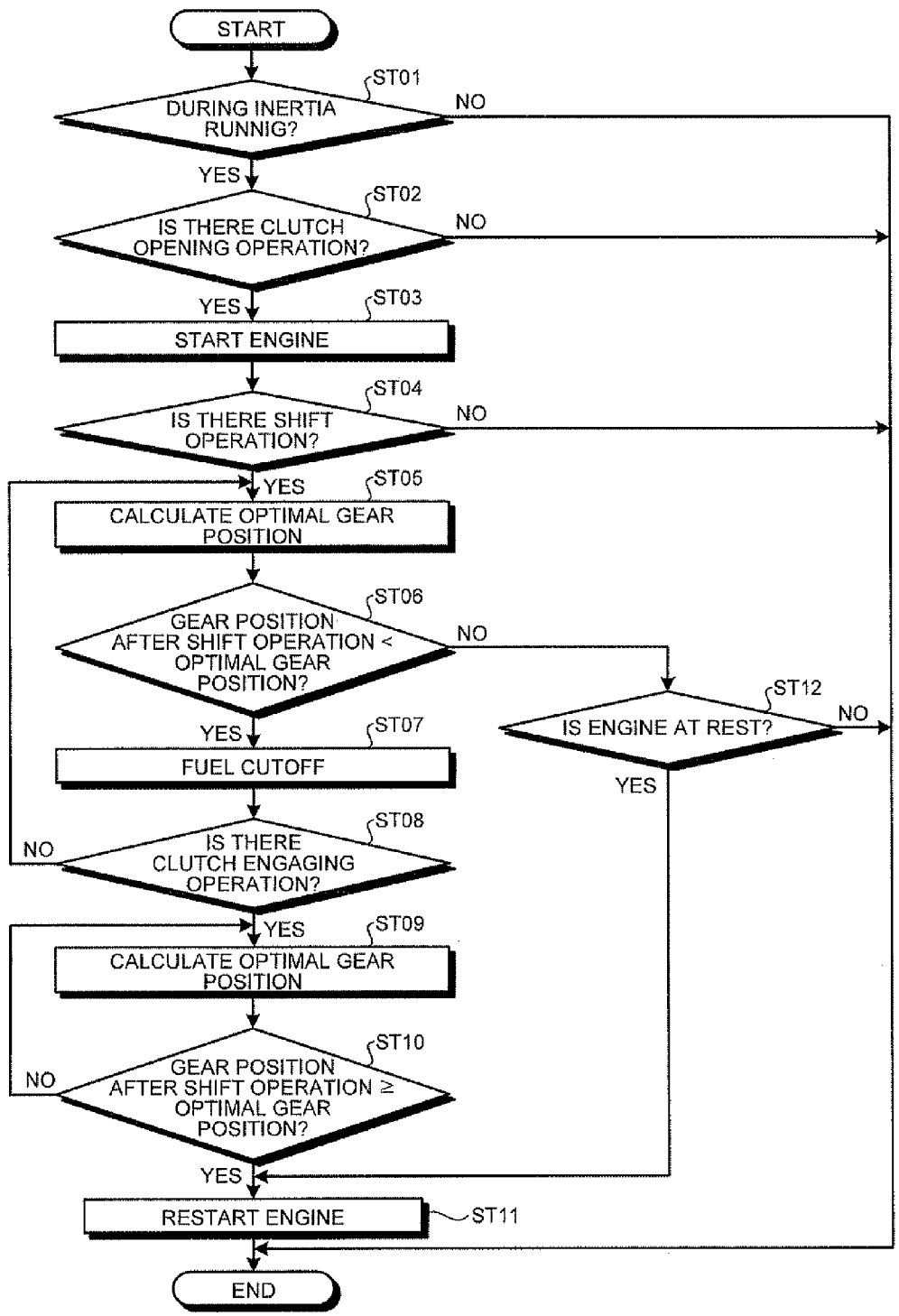
FIG. 2 is a flowchart illustrating an operation of the vehicle drive system illustrated in FIG. 1.
Figure 3:
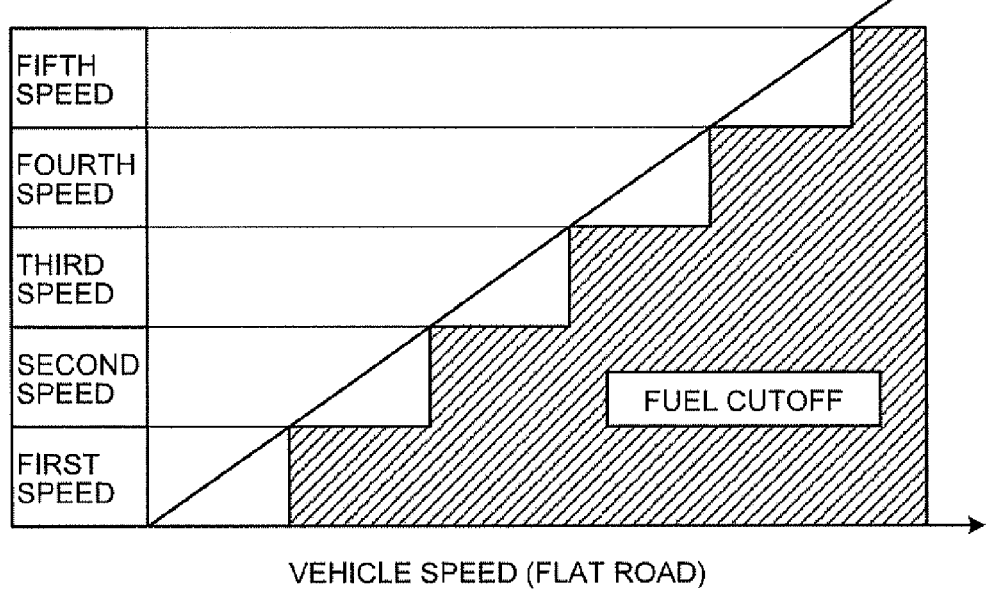
FIG. 3 is an explanation diagram illustrating the operation of the vehicle drive system illustrated in FIG. 1.

FIGS. 2 and 3 are a flowchart (FIG. 2) and an explanation diagram (FIG. 3) illustrating an operation of the vehicle drive system illustrated in FIG. 1. Out of the drawings, FIG. 2 illustrates the flowchart of shift operation mistake responding control and FIG. 3 illustrates a relationship between the vehicle speed V on a flat road and an optimal gear position.

When the eco-run control is performed during the inertia running, the gear position of the transmission 4 is in neutral, the clutch 3 is in the engagement state, the fuel injector 23 is stopped, and the engine 2 is at rest. When accelerating the vehicle again, the driver depresses the clutch pedal 81 as preliminary operation of shift operation and the clutch 3 is put into the open state. Then, a condition to restart the engine 2 is established, the fuel injection is restarted, and the engine 2 restarts. Next, when the driver operates the shift device 82 to select an optional shift position, the gear position of the transmission 4 is changed according to the selected shift position. Then, by release of the clutch pedal 81 by the driver, the clutch 3 is put into the engagement state and the driving torque of the engine 2 is transmitted to the axle 12 through the clutch 3 and the transmission 4.

At that time, when the shift position selected by the driver is lower than the shift position, which should be essentially selected for a current vehicle speed (the shift operation mistake occurs), the engine might receive motion energy of the vehicle to be put into the excessive revolution state. Although such a problem might be generated in a normal manual transmission (MT) vehicle, which does not perform the eco-run control, this is especially likely to be generated in an eco-run vehicle to stop the engine during the inertia running.

Figure 4:
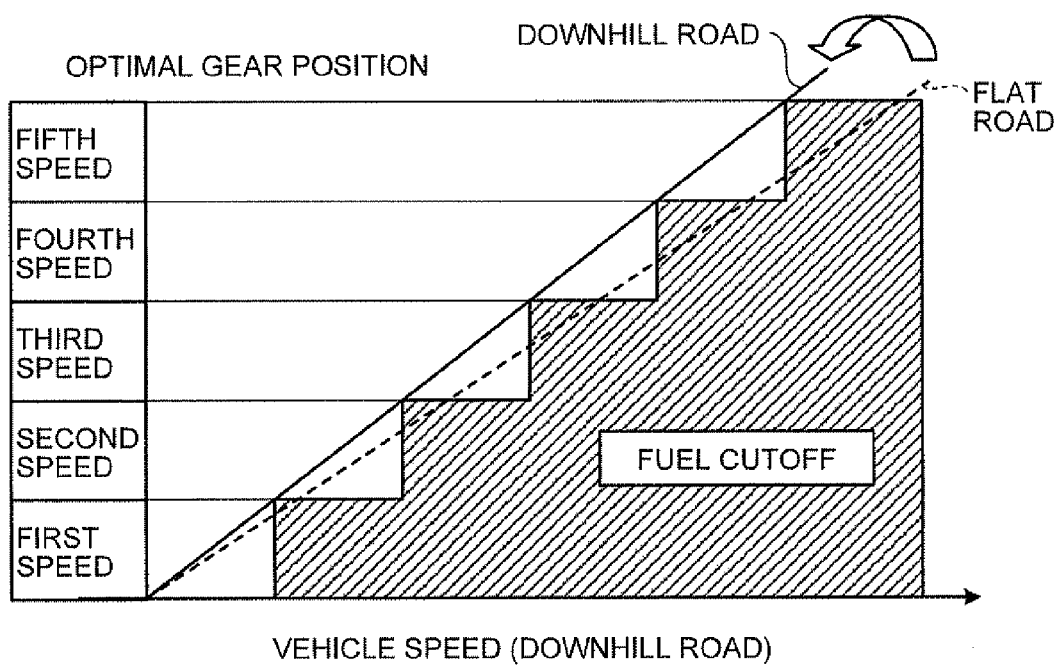
FIG. 4 is an explanation diagram illustrating the operation of the vehicle drive system illustrated in FIG. 1.

Therefore, in the vehicle drive system 1, in order to inhibit generation of the excessive revolution state of the engine due to the shift operation mistake at the time of switching from the inertia running to the running on the engine, following shift operation mistake responding control is performed (refer to FIGS. 2 to 4).

At a step ST01, it is judged whether the vehicle is in the inertia running. The inertia running is intended to mean the run in a state in which the power source and the axle of the wheels are separated from each other. Specifically, while the vehicle runs, when the gear position of the transmission 4 is in neutral and the engine 2 is at rest, it is judged that the vehicle is in the inertia running. Also, in this state, the fuel injector 23 stops the fuel injection to a combustion chamber of the engine 2 and an ignition plug (not illustrated) is stopped. Also, the clutch pedal 81 is released and the clutch 3 is in the engagement state. For example, in this embodiment, while the vehicle runs, the shift position sensor 62 detects the shift position of the shift device 82 and the engine revolution speed sensor 64 detects the engine revolution speed Ne. When the shift position is in neutral and the engine revolution speed Ne satisfies Ne=0 [rpm], the control device 7 makes positive judgment. At the step ST01, the procedure shifts to a step ST02 when the positive judgment is made and a process is finished when negative judgment is made.

At the step ST02, it is judged whether clutch opening operation is performed. The clutch opening operation is performed by depressing operation of the clutch pedal 81 by the driver. At the time of shift change by the driver, the clutch opening operation is performed as initial operation and thereafter the shift operation (step ST04) and clutch engaging operation (step ST08) are performed. By the clutch opening operation, the clutch 3 is driven to be put into the open state. Meanwhile, in this embodiment, while the vehicle runs, the clutch pedal sensor 61 detects the depressing operation of the clutch pedal 81 and the control device 7 makes the positive judgment based on the output signal of the clutch pedal sensor 61. At the step ST02, the procedure shifts to a step ST03 when the positive judgment is made and the process is finished when the negative judgment is made.

At the step ST03, the engine 2 is started (restarted). The depressing operation of the clutch pedal 81 during the inertia running (the positive judgment at the step ST01 and the positive judgment at the step ST02) leads the engine 2 to start as described above. Meanwhile, in this embodiment, the control device 7 drives the fuel injector 23 to start the fuel injection and drives a starter and the ignition plug (not illustrated) to start the engine 2. After the step ST03, the procedure shifts to the step ST04.

At the step ST04, it is judged whether the shift operation is performed. The shift operation is performed by the operation of the shift device 82 by the driver. Also, the shift operation during the inertia running is the operation to change the gear position of the transmission 4 from neutral to any one of the five forward positions 43 to 47. By the shift operation, the gear position of the transmission 4 is changed to the forward position. Meanwhile, in this embodiment, while the vehicle runs, the shift position sensor 62 detects the shift position of the shift device 82 and the control device 7 obtains the gear position after the shift operation based on the output signal from the shift position sensor 62 to judge presence of the shift operation. At the step ST04, the procedure shifts to a step ST05 when the positive judgment is made and the process is finished when the negative judgment is made.

At the step ST05, the optimal gear position is calculated. The optimal gear position is intended to mean a predetermined gear position defined based on a relationship with the vehicle state amount (for example, the vehicle speed V and the accelerator opening θ). For example, in this embodiment, the vehicle speed sensor 65 detects the vehicle speed V and the control device 7 uniquely selects the optimal gear position based on the vehicle speed V and a predetermined control map (refer to FIG. 3) read from the storage unit 75. The procedure shifts to a step ST06 after the step ST05.

At the step ST06, it is judged whether the gear position after the change by the shift operation (step ST04) is lower than the optimal gear position (step ST05). Meanwhile, the control device 7 makes the judgment in this embodiment. At the step ST06, the procedure shifts to a step ST07 when the positive judgment is made and the procedure shifts to a step ST12 when the negative judgment is made.

At the step ST07, the fuel cutoff is performed. That is to say, when the gear position after the change by the shift operation (step ST04) is lower than the optimal gear position (step ST05) (the positive judgment at the step ST06), the engine 2 might be put into the excessive revolution state by the motion energy of the vehicle when the clutch engaging operation (step ST08) is performed thereafter. Therefore, in such a case, the fuel cutoff is performed to stop the engine 2, and according to this, increase in the engine revolution speed Ne is inhibited and the engine 2 is protected. Meanwhile, in this embodiment, the control device 7 drives the fuel injector 23 to stop the fuel injection and stop the ignition plug (not illustrated), thereby stopping the engine 2. After the step ST07, the procedure shifts to a step ST08.

At the step ST06, it is judged whether the clutch engaging operation is performed. The clutch engaging operation is performed by releasing operation of the clutch pedal 81 by the driver. Meanwhile, in this embodiment, while the vehicle runs, the clutch pedal sensor 61 detects the operation of the clutch pedal 81 and the control device 7 makes the positive judgment when a depressed state of the clutch pedal 81 is released. At the step ST08, the procedure shifts to a step ST09 when the positive judgment is made and the procedure shifts to the step ST05 when the negative judgment is made.

At the step ST09, the optimal gear position is calculated. That is to say, at the step ST09, the gear position of the transmission 4 is in the forward position selected by the driver (the positive judgment at the step ST04), the fuel cutoff is performed and the engine 2 is at rest (step ST07). Then, the clutch engaging operation by the driver is performed and the clutch 3 is put into the engagement state (the positive judgment at the step ST08), and the vehicle runs using engine braking while continuously performing the fuel cutoff. Therefore, the vehicle speed V decreases and the optimal gear position changes every moment, so that the optimal gear position is calculated again. Meanwhile, in this embodiment, the vehicle speed sensor 65 detects the vehicle speed V and the control device 7 uniquely selects the optimal gear position based on the vehicle speed V and the predetermined control map (refer to FIG. 3) read from the storage unit 75. After the step ST09, the procedure shifts to a step ST10.

At the step ST10, it is judged whether the gear position after the change by the shift operation (step ST04) is not lower than the optimal gear position (the positive judgment at the step ST08 and the step ST09) after the clutch engaging operation. Meanwhile, the control device 7 makes the judgment in this embodiment. At the step ST10, the procedure shifts to a step ST11 when the positive judgment is made and the procedure returns to the step ST09 when the negative judgment is made.

At the step ST11, the engine 2 is restarted. That is to say, when the gear position after the change by the shift operation (step ST04) is lower than the optimal gear position (the positive judgment at the step ST06), the fuel cutoff (step ST07) is performed and the engine 2 is at rest. Then, it is controlled to restart the engine 2. Meanwhile, there is a case in which the engine 2 is restarted after the clutch engaging operation (the positive judgment at the step ST08) and a case in which this is restarted before the clutch engaging operation (the positive judgment at the step ST06). After the step ST11, the process is finished.

At the step ST12, it is judged whether the engine is at rest. That is to say, when the fuel cutoff is performed (when the negative judgment at the step ST06 is made after the step ST07 and the negative judgment at the step ST08), the engine 2 is at rest (engine revolution speed Ne=0 [rpm]). On the other hand, when the fuel cutoff is not performed, the engine 2 is in operation (step ST03). Then, it is judged whether the engine is at rest at the step ST12. Meanwhile, in this embodiment, the engine revolution speed sensor 64 detects the engine revolution speed Ne and when the engine revolution speed Ne=0 [rpm], the control device 7 makes the positive judgment. At the step ST12, the procedure shifts to the step ST11 when the positive judgment is made and the process is finished when the negative judgment is made.

Meanwhile, in this embodiment, the control map (refer to FIG. 3), which defines the relationship between the vehicle speed V and the optimal gear position, is used when calculating the optimal gear position (step ST05) as described above. In the control map, it is defined such that the optimal gear position becomes higher as the vehicle speed V is larger. Also, when the gear position selected by the shift operation by the driver (the positive judgment at the step ST04) is lower than the optimal gear position, the fuel cutoff for the engine 2 is executed (step ST07).

Herein, in this embodiment, the control device 7 calculates the optimal gear position by using only the control map (refer to FIG. 3), which defines the relationship between the vehicle speed V on the flat road and the optimal gear position (step ST05).

However, this is not limitation and it is also possible that the control device 7 includes both of the control map (refer to FIG. 3), which defines the relationship between the vehicle speed V on the flat road and the optimal gear position, and the control map (refer to FIG. 4), which defines the relationship between the vehicle speed V on a downhill road and the optimal gear position, to calculate the optimal gear position by switching the control maps according to the gradient of the running road. For example, during the inertia running, the gradient sensor 66 detects the gradient of the running road and the control device 7 may calculate the optimal gear position by using the control map for the flat road when the gradient of the running road is smaller than a predetermined threshold value and the control device 7 may calculate the optimal gear position by using the control map for the downhill road when the gradient of the running road is not smaller than the predetermined threshold value. Also, the control device 7 may estimate the gradient of the running road by navigation information using a global positioning system (GPS) in place of the gradient sensor 66 (not illustrated).

Meanwhile, during the run along the downhill road, the motion energy of the vehicle increases than that during the run along the flat road. Therefore, the optimal gear position is set to be higher in the control map for the downhill road than that in the control map for the flat road. According to this, the increase in the engine revolution speed Ne by the motion energy is effectively inhibited.

[Effect]

As described above, the vehicle drive system 1 is provided with the engine 2, the manual transmission 4 capable of changing the gear position, the clutch 3 arranged between the engine 2 and the transmission 4, and the control device 7, which performs the drive control of the engine 2 (refer to FIG. 1). During the inertia running in which the torque transmission between the engine 2 and the axle 12 is blocked (the positive judgment at the step ST01), when the clutch 3 is opened and the gear position of the transmission 4 is changed to the forward position (the positive judgment at the step ST02 and the positive judgment at the step ST04), if the gear position after the change is lower than the optimal gear position corresponding to the vehicle speed V (refer to FIG. 3) (the positive judgment at the step ST06), the control device 7 executes the fuel cutoff for the engine 2 (step ST07) (refer to FIG. 2).

In such a configuration, when the gear position after the change is lower than the optimal gear position corresponding to the vehicle speed V (when the shift operation mistake occurs), the fuel cutoff is executed, so that the increase in the engine revolution speed by the motion energy of the vehicle is inhibited when the clutch 3 is engaged thereafter. According to this, a case in which the engine 2 is put into the excessive revolution state due to the shift operation mistake can be inhibited, so that there is an advantage that the engine 2 is appropriately protected.

Also, in the vehicle drive system 1, when the clutch 3 is engaged after the above-described fuel cutoff is executed (the steps ST07 and the positive judgment at the step ST08), if the gear position after the above-described change is lower than the optimal gear position corresponding to the vehicle speed V after the clutch engagement, the control device 7 continues the fuel cutoff for the engine 2 (the steps ST09 and the negative judgment at the step ST10) (refer to FIG. 2). According to this, there is the advantage that the increase in the engine revolution speed after the clutch engagement can be effectively inhibited.

Also, in the vehicle drive system 1, the control device 7 starts the engine 2 when the clutch 3 is opened during the inertia running (the positive judgment at the step ST02 and the step ST03) (refer to FIG. 2). According to this, there is the advantage that the engine 2 is appropriately started.

INDUSTRIAL APPLICABILITY

As described above, the vehicle drive system according to the present invention is useful in that the generation of the excessive revolution state of the engine due to the shift operation mistake can be inhibited at the time of the switching from the inertia running to the running on the engine.

REFERENCE SIGNS LIST

1 VEHICLE DRIVE SYSTEM
2 ENGINE
21 CRANKSHAFT
22 OUTPUT SHAFT
23 FUEL INJECTOR
3 CLUTCH
31 INPUT-SIDE ROTOR
32 OUTPUT-SIDE ROTOR
4 TRANSMISSION
41 INPUT SHAFT
42 OUTPUT SHAFT
43 to 47 FORWARD POSITION
48 REVERSE POSITION
5 REDUCTION DIFFERENTIAL GEAR
51 INPUT SHAFT
52 REDUCTION MECHANISM
53 DIFFERENTIAL MECHANISM
6 SENSOR UNIT
61 CLUTCH PEDAL SENSOR
62 SHIFT POSITION SENSOR
63 ACCELERATOR OPENING SENSOR
64 ENGINE REVOLUTION SPEED SENSOR
65 VEHICLE SPEED SENSOR
66 GRADIENT SENSOR
7 CONTROL DEVICE
71 ECO-RUN CONTROL UNIT
72 EXCESSIVE REVOLUTION PREVENTING CONTROL UNIT
73 SHIFT OPERATION MISTAKE RESPONDING CONTROL UNIT
74 ENGINE CONTROL UNIT
75 STORAGE UNIT
81 CLUTCH PEDAL
82 SHIFT DEVICE
11R, 11L WHEEL
12 AXLE

The invention claimed is:
1. A vehicle drive system comprising:
an engine;
a manual transmission capable of changing a gear position;
a clutch arranged between the engine and the transmission; and
a control device that performs drive control of the engine, wherein during an inertia running in which torque transmission between the engine and an axle is blocked, when the clutch is opened and the gear position of the transmission is changed to a forward position, if the gear position after the change is lower than an optimal gear position corresponding to a vehicle speed, the control device executes fuel cutoff for the engine.

2. The vehicle drive system according to claim 1, wherein when the clutch is engaged after the fuel cutoff is executed, if the gear position after the change is lower than the optimal gear position corresponding to the vehicle speed after engagement of the clutch, the control device continues the fuel cutoff for the engine.

3. The vehicle drive system according to claim 1, wherein the control device starts the engine when the clutch is opened during the inertia running.

4. The vehicle drive system according to claim 2, wherein the control device starts the engine when the clutch is opened during the inertia running.

* * * * *